United States Patent Office

2,884,310
Patented Apr. 28, 1959

2,884,310

PRODUCTION OF ALKALI METAL HYDROXIDES BY ION EXCHANGE

Norman W. Rosenberg, Newton, and William E. Katz, Boston, Mass., assignors to Ionics, Incorporated, Cambridge, Mass., a corporation of Massachusetts No Drawing. Application January 7, 1957
Serial No. 632,644

10 Claims. (Cl. 23—184)

This invention relates to an improved method of making alkali metal hydroxides by exchange of ions wherein anion exchange resins are contacted with a solution of alkali metal salts; and wherein calcium hydroxide (lime) is employed as the regenerant of an exhausted or partially exhausted exchange resin. More particularly, this invention relates to the use of anion exchange resins which are intimately mixed with the regenerant solid calcium hydroxide or calcium oxide or with an aqueous suspension thereof.

The prior art has recognized and disclosed at a comparatively early date the concept of preparing caustic soda (NaOH), or the like, by an anion exchange reaction wherein a salt (NaCl) solution is contacted with an anion exchange material in the hydroxyl form, causing the anion (Cl⁻) of the salt solution to be exchanged or substituted by the anion (OH⁻) of the resin and an effluent containing NaOH is recovered. Such procedures are disclosed in U.S. Patents No. 1,238,916 to Charles P. Hoover, and No. 2,606,098, issued August 5, 1952, to W. C. Bauman. After due exhaustion of the (OH⁻) ions of the anion exchange material, a lime solution is contacted with said exhausted or partially exhausted exchange resin whereby the (OH⁻) ions of the lime solution replaces the (Cl⁻) ions therein. This regenerates the resin to its original hydroxyl form for continuance of the cycle of producing caustic. With many qualifications of weak or strong anion exchange resins, temperature controls, direction of flow, and concentration of solutions employed, this general procedure is believed to be the state of the art as of the present time.

Disadvantages of the prior art represented by the procedures above, include high water consumption, high lime consumption, and high resin requirements for a given rate of caustic production since the maximum lime solubility in the aqueous lime solution specified by the prior art is limited to 0.04 milliequivalent per milliliter. The high water consumption is required to carry the quantity of lime, necessary for regeneration, into the bed at the low lime concentration in aqueous solution, and which is unable to drive the exchange reaction (which is noted to be a reversible one) to completion in the direction required. The high resin inventory is required because the regeneration rate is dependent on regenerant concentration, which is low at the low lime solubility.

By the method of the present invention a much lower consumption of water is required for a given degree of regeneration resulting in a lower lime consumption approaching the theoretical requirement for the reaction, while the reaction also proceeds at such a rate that the resin inventory is reduced for a given rate of caustic production. Thus, the present invention is an improvement over prior art procedures for making caustic soda by the principle of ion exchange.

A primary object of the present invention is to provide an improved method of producing caustic which enables such processes to be operated with enhanced economy of the reaction as to be commercially competitive with, and even less expensive than other known methods of producing caustic. Another object is to provide optimum regeneration techniques in such processes. Another object is to minimize the resin inventory and thereby minimize the capital investment for a given caustic production rate.

In general, according to the present invention one form of the process consists of treating an anion exchange resin in the chloride form first with an aqueous lime suspension or slurry to convert the resin to the hydroxide form, and thereafter with an aqueous sodium chloride solution, or purified sea water, which by ion exchange becomes partially converted to sodium hydroxide. The process is cyclic and can be carried out in simple and conventional process equipment to the desired degree of conversion. The effluent caustic-salt mixtures obtained may subsequently be evaporated to obtain a caustic of desired concentration with removal of crystallized salt therefrom.

Another feature of the present invention contemplates the initial mixing of solid granular or powdered lime in intimate contact with the anion exchange resin which upon passing water, lime solution, or a lime suspension therethrough will cause displacement of the anions in the resin, such as chloride ions present therein with the hydroxyl ions, and by virtue of the passing of alkali salt solutions therethrough to produce the desired effluent caustic, the anion exchange resin is regenerated to the hydroxyl form by merely passing water, lime solution, or a lime suspension therethrough whereupon cyclic continuance of the procedure is effected.

If sea water is employed instead of a pure sodium chloride solution as the eluting salt solution in the above procedure it becomes necessary to remove the magnesium from the sea water. This may be effected by pretreating the sea water with lime precipitating magnesium hydroxide which is filtered from the sea water prior to passing the sea water to the ion-exchange resin for caustic production.

Many commercial grades of anion exchange resins are available and the recent development of strongly basic resins of the quaternary ammonium type makes possible the production of strong bases from the brines contacted with such resins. This requires efficient and economical regeneration of the exhausted exchange beds in the manner disclosed herein. It is also contemplated in the present invention to connect several columns in series for concurrent or countercurrent directions of flow during regeneration and exhaustion of the ion exchange beds for continuous cyclic operation as well as more efficient and economical operation for the production of caustic. Partial recycle of a portion of the caustic produced is effective in producing the highest caustic concentration and the highest ratio of caustic to salt in the product effluent to thereby minimize final evaporation costs in removing the salt, and/or concentrate the caustic to the desired predetermined level.

It will be apparent that commercially available anion exchange resins can be converted to the hydroxide form with lime. Hydroxide form resins can then convert salt to caustic by passing a solution of the salt through the resin while the resin itself is being converted to the chloride form. The resin can then be reconverted to the hydroxide form with more lime. This cycle may be repeated indefinitely resulting in a process as indicated in the following equations:

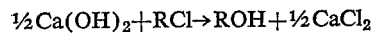
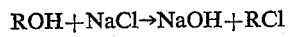

½Ca(OH)₂+RCl→ROH+½CaCl₂

ROH+NaCl→NaOH+RCl where R represents the anion exchange agent well known in the art, such as anion synthetic organic polymeric resins, or more particularly, quaternized chloromethylated copolymers of mono and divinyl benzenes, etc.

Since lime is only sparingly soluble in water, it is apparent that if a clear saturated lime solution is passed through a bed of anion exchange resin in at least partially chloride form, a relatively large volume of lime solution is required to provide sufficient hydroxyl ions and proper conversion of the resin to the hydroxyl form. Another factor increasing the volume of solution required for hydroxyl conversion of the resin is that the conversion efficiency is not 100% and some unreacted lime is present in solution leaving the resin bed. The volume of solution required can be radically reduced by utilizing a lime suspension or slurry rather than a true solution since the suspended particles provide a reservoir of hydroxyl ions which dissolve as the hydroxyl ions originally present are taken from solution on passage through the bed. The solid lime may be suspended in the solution fed to the bed, or instead it may be intimately dispersed in the bed itself, or a combination thereof.

It should also be noted that, the mere passage of lime suspension through a resin bed, except under the condition of intimately mixed solid lime with said anion exchange resin or under fluidized bed conditions, would not be of the highest efficiency since the suspended lime would tend to be filtered out by the first layers of resin, and the continuous solution of lime would not take place in the main body of the resin, as contemplated in the present invention. It is therefore preferred that solid lime be packed with or intimately mixed with the ion exchange agent in chloride form for converson to hydroxyl form by the passage of water, lime slurry, or lime solution therethrough.

It should also be noted that it is not necessary that the solid lime be removed from the bed of ion exchange resin during the caustic production part of the cycle since the solubility of lime in the caustic produced is radically lowered under its solubility in water so that substantially no lime leaves the bed during the caustic production part of the cycle.

The following examples illustrate practice of the invention, but are not to be construed as limiting the scope thereof.

*Example 1*

A one liter volume of a granular strongly basic anion exchange resin containing quaternary ammonium chloride groups purchased from the Dow Chemical Company, Midland, under the name of Dowex A-2, was placed in a glass tube. The resin was initially 100% in the chloride form and had an anion exchange capacity of about one equivalent per liter of settled bed volume. A suspension of 300 g. $Ca(OH)_2$ in 300 ml. water was injected into the bed, and the mixture agitated by blowing air upward through the bed. A clear saturated lime solution at 20° C. was then slowly passed upward through the bed, at a rate of 2 liters per hour and collected for analysis. After two hours (4 liters of regenerant solution) the chloride contained in the combined effluent was 0.4 equivalent, and its concentration in the effluent was 0.10 N. The hydroxyl concentration in this effluent was 0.036 N. The bed was computed to have 40% of its capacity in the hydroxyl form after this regeneration. Air was used to blow the residual bed water from the bed, and a slow (2 liters/hour) flow of 2.6 N NaCl was passed downward through the bed. After 0.6 liter of this solution was collected, it was analysed to contain 0.3 equivalent of NaOH and 0.8 equivalent of NaCl. Further elution with 3 additional liters of 2.6 N NaCl recovered an additional 0.1 equivalent of NaOH.

*Example 1a*

To compare the results obtained above with the results obtained when the present invention was not incorporated in the experiment, a resin bed identical to that described in Example 1 above was treated with a clear saturated lime solution without prior injection of lime into the resin bed. The same flow rate was used for regeneration as in Example 1 for the same period of time. The effluent chloride removed from the bed by this treatment totaled only 0.1 equivalent, amounting to a 10% bed regeneration. The identical brine portion of the cycle yielded only 0.08 equivalent of NaOH and 1.0 equivalent of NaCl in 0.6 liter of effluent. Thus it will be apparent that the use of the present invention increased the caustic production rate by the ratio 0.3/0.08 or almost four fold for the same resin inventory and the same water consumption.

*Example 2*

A one liter sample of resin identical to that taken in Example 1 was treated in a column by passing a lime suspension containing 100 mg. of lime per liter of water upwards through the resin bed at a rate of 2 liters per minute, which was sufficient to fluidize the resin bed. The regenerating lime solution, with a total volume of four liters, was recirculated until the chloride concentration reached 0.07 N corresponding to a 28% resin regeneration.

The resin bed was then blown free of regenerant solution with air, and a downward flow of 2 N NaCl was passed through the resin until a total of 1 liter of effluent product was obtained, which was found to be 0.2 N in hydroxide concentration.

*Example 3*

A series of four one liter columns of resin (1, 2, 3, and 4) identical to that taken in Example 1 were each mixed with lime as described in Example 1. Water was passed at a flow rate of 2 liters/hour upward through column 1, the effluent was passed upward through the remaining columns 2, 3, and 4, in successive order.

This regeneration was followed by elution with 1 liter of 3 N NaCl passed successively through columns 4, 3, 2 and 1. After several cycles, the following steady-state cycling condition was obtained.

Regeneration:
    Time: 4 hours
    Volume: 3 liters
    Effluent Cl: 0.2 eq./lit.; 1.6 eq. total
    Effluent OH: 0.04 eq./lit.; 0.32 eq. total
Production:
    Time: 2 hours
    Volume: 1 liter
    Effluent Cl: 2.0 eq./lit.; 2.0 eq. total
    Effluent OH: 1.6 eq./lit.; 1.6 eq. total Various embodiments of the invention may be devised to meet various requirements.

Having described the invention, we claim:

1. A method of making an alkali metal hydroxide from an alkaline earth hydroxide and an alkali metal salt by exchange of ions which comprises, passing an aqueous stream into contact with a water-insoluble anion exchange resin in intimate contact with solid alkaline earth hydroxide, and thereafter treating the anion exchange resin with an aqueous solution of an alkali metal salt to effect displacement of the absorbed hydroxyl ions with formation of alkali metal hydroxide and withdrawing the latter in solution as an effluent product.

2. A method of making an alkali metal hydroxide from calcium hydroxide and an alkaline metal halide by exchange of ions which comprises, passing an aqueous slurry of lime through a water insoluble anion exchange resin and thereafter treating the anion exchange resin with an aqueous solution of an alkali metal halide to effect displacement of the absorbed hydroxyl ions with formation of alkali metal hydroxide and withdrawing the latter in solution as an effluent product.

3. A method of making alkali metal hydroxide from calcium hydroxide and alkali metal chloride by exchange of ions which comprises, passing water into contact with a water-insoluble anion exchange resin which is in intimate mixture with solid calcium hydroxide, said anion exchange resin containing quaternary ammonium chloride groups to absorb hydroxyl ions, and thereafter treating the anion exchange resin with an aqueous solution of an alkali metal chloride to effect displacement of the absorbed hydroxyl ions with formation of alkali metal hydroxide and withdrawing the latter in an effluent solution, concentrating said effluent to remove crystallized alkali metal halide therefrom.

4. A method of making an alkali metal hydroxide from calcium hydroxide and an alkali metal halide by exchange of ions which comprises, passing an aqueous lime-containing stream into contact with a halide of a water-insoluble anion exchange resin which is mixed with and in intimate contact with solid calcium hydroxide and thereafter treating the anion exchange resin with an aqueous solution of an alkali metal halide to effect displacement of the absorbed hydroxyl ions with formation of alkali metal hydroxide, and withdrawing the latter in solution as an effluent product.

5. A method of making alkali metal hydroxide from calcium hydroxide and alkali metal chloride by exchange of ions which comprises, passing an aqueous lime-containing stream into contact with a water-insoluble anion exchange resin which is in initimate mixture with solid calcium hydroxide, said anion exchange resin containing quaternary ammonium choride groups to absorb hydroxyl ions, and thereafter treating the anion exchange resin with an aqueous solution of an alkali metal chloride to effect displacement of the absorbed hydroxyl ions with formation of alkali metal hydroxide and withdrawing the latter in an effluent solution, concentrating said effluent to remove crystallized alkali metal halide therefrom.

6. A process as claimed in claim 5 wherein the anion exchange resin consists of the reaction product of a vinyl-aromatic resin having halo-methyl radicals attached to its aromatic nuclei and a tertiary amine selected from the group consisting of the tertiary mono- and di-alkyl N-substituted alkanolamines.

7. A method of making sodium hydroxide from calcium hydroxide and sodium chloride by exchange of ions which comprises, passing an aqueous lime-containing stream into contact with a water-insoluble anion exchange agent which is intimately mixed with solid calcium hydroxide, thereafter treating the anion exchange agent with an aqueous solution of sodium chloride to effect displacement of the absorbed hydroxyl ions with formation of sodium hydroxide removing the latter in an effluent solution and purifying and concentrating the same by evaporation to a desired level.

8. A method of making sodium hydroxide from calcium hydroxide and sodium chloride by exchange of ions which comprises, passing an aqueous lime-containing stream in series through a number of beds of water-insoluble anion exchange resin containing quaternary ammonium halide groups in intimate mixture with solid calcium hydroxide to absorb hydroxyl ions, thereafter passing an aqueous alkali metal halide solution countercurrent in series through the beds of anion exchange resin mixture to effect displacement of the absorbed hydroxyl ions with formation of alkali metal hydroxide, collecting the effluent hydroxide-containing solution from the final bed, and again passing an aqueous lime-containing stream in series through said anion exchange resin beds after the latter has been depleted of hydroxyl ions by passage of said alkali metal halide solution through the same.

9. A process as claimed in claim 7 wherein the anion exchange resin consists of the reaction product of a chloromethylated copolymer of a poly vinyl-aromatic compound and a monovinyl aromatic compound and dimethylethanolamine.

10. A method of making sodium hydroxide from calcium hydroxide and sodium chloride by exchange of ions which comprises, passing an aqueous slurry of calcium hydroxide through a bed of water-insoluble anion exchange resin in the chloride form, to absorb hydroxyl ions, thereafter passing a concentrated aqueous solution of sodium chloride through the bed of anion exchange resin to effect displacement of the absorbed hydroxyl ions with formation of sodium hydroxide solution, collecting the resulting sodium hydroxide solution, again passing an aqueous suspension of calcium hydroxide through the anion exchange resin after the latter has been at least partially depleted of hydroxide ions by passage of the sodium chloride solution through the same and thereafter passing the collected sodium hydroxide solution from the first cycle of operation through the anion exchange resin in countercurrent direction to the flow of the aqueous suspension of calcium hydroxide, to displace hydroxyl ions from the latter with formation of sodium hydroxide, thereafter passing sufficient concentrating sodium chloride solution into said bed of anion exchange resin to complete the hydroxyl displacement reaction and continuing the cycle of operations.

References Cited in the file of this patent
UNITED STATES PATENTS 2,606,098   Bauman _____ Aug. 5, 1952